3,432,311
DRIED MEAT PRODUCT AND METHOD OF MAKING SAME

Ernst Otto Gruner, Chicago, Ill. (434 Horacemann Ave., Winston-Salem, N.C. 27104)
No Drawing. Filed July 15, 1965, Ser. No. 472,356
U.S. Cl. 99—208          8 Claims
Int. Cl. A23b *1/04*; B65f *25/06*

ABSTRACT OF THE DISCLOSURE

Meat such as beef, pork, fowl and fish, each alone or as a mixture, is divided into a major part as chunks and a minor part as comminuted meat. Each part is mixed with preservative sodium chloride, and for cured meat, with curing salt. The parts are mixed and a confined form thereof is frozen, then softened by slight warming, sliced thin, and heated to at least 160° F. to bind the parts together. Then the cooled slices are dehydrated.

---

The present invention relates to the production of dried meat products, and in particular, to thin slices of substantially uniform texture and appearance suitable for vacuum packaging in polyethylene envelopes for display and sale in taverns and the like.

Meat such as beef, pork, fowl and fish, each alone or as a mixture, may be employed for the invention. All of these meats are processed in raw form, and are suitably treated with sodium chloride as a preservative. All may be subjected to curing agents. Beef and pork are preferably cured because of the bright red color which can be so produced. Fowl and fish need not be so cured.

The general object of the invention is to produce edible preserved dry thin slices of substantially uniform thickness and substantially uniform color and appearance.

The process involves dehydration of a salt-preserved, preferably cured, compacted meat mass. To minimize the step of dehydration, the meat is preferably treated to saline material by the well-known dry procedures, rather than by use of brines or pickle liquors. The dry processing requires storage time in a cooler to secure penetration.

In carrying out the process raw whole meat is trimmed of fat, sinews and non-lean tissue. The so trimmed meat is converted one part into small whole meat chunks, for example, up to three to four inches in largest dimension, and in part into comminuted meat. The comminuted meat may be a coarse grind or an emulsion, or a mixture of such.

The comminuted part is used to provide binder to integrate the product. The natural juices of the meat contain soluble proteins which can be coagulated by heat to provide binder for the chunks, and the solids of the juices of the preserved meat contribute to the binding action.

The two parts are subjected to a saline treatment, particularly to introduce the sodium chloride preservative, and when desired to introduce curing agents and optional auxiliary agents for curing. The curing salt may be alkalimetal nitrite or nitrate, or both. To avoid adding water to the meat, the two parts, separately, are thoroughly mixed with the desired dry salt or salts with auxiliary and flavoring agents, stored in a cooler to effect and insure penetration of the salt into the meat pieces. The whole meat chunks are sufficiently penetrated in about 12 hours.

Then the two salted parts are thoroughly mixed and packed into a form, which may be a sausage casing of six inches diameter, for example, or preferably a rectangular tray or box receptacle lined with a cellophane or plastic liner to facilitate removal. The comminuted part is provided in sufficient portion to fill the spaces between the chunks and to act as a cement to bond the chunks together in the form. In packing into the form air bubbles are excluded. In general, about 25% of the meat is a suitable proportion to constitute the comminuted part. In cutting the trimmed meat to provide the two parts, the smaller pieces are used for comminuting, permitting the chunks to be more nearly the same in size.

In the form, the compacted meat is frozen stiff. The freezing releases from solution the dissolved protein and meat juice solids to function as a cement for the mass.

The freezing may be accomplished at about 0° F., or lower, as particular meats may require it. For example, pork, to meet Federal standards with respect to killing possible trachina in the meat, must be frozen at a specified temperature for at least a specified number of days such as:

5° F. for 20 days, or
−10° F. for 10 days, or
−20° F. for 6 days.

At the end of the freezing the meat mass is softened by warming it to about 28° F., at which it is a solid integral mass of meat. This is then machine sliced into thin slices, preferably of uniform thickness, and about ¼-inch thick. A rectangular box or tray for the freezing contributes to the production of uniform slices.

The slices are then briefly heated, preferably in a smokehouse, to a temperature upwardly from 160° F. preferably in the range from 180° F. to 200° F. This coagulates dissolved protein and fixes the bond of the meat. In meats to which curing salt has been added, the heat brings out and fixes the bright red cured color, which especially characterizes cured beef and pork.

Then the slices are placed on a perforated base, such as a coarse screen, and subjected to dehydration, at below a cooking temperature, in an oven preferably at a temperature of about 120° F.

The dehydrated slices can then be cut into pieces of uniform size, such as strips about ½ x 4 inches. Counted strips for measured weight may then be inserted in polyethylene envelopes, vacuum packed and sealed. Such packaged meat has long shelf life and retains its bright cured color, thus being suitable for display and sale, as from a card background carrier for the sealed envelopes.

Conventional saline agents may be used. A suitable formula for the composition to be mixed with each of the two meat parts, on the basis of 100 pounds of lean meat consists of:

Sodium chloride _____ pounds__ 1.5
Curing salt composition: sodium chloride 90%; sodium nitrite 6%; sodium nitrate 4% _____ ounces__ 6
Sugar _____ do____ 6
Seasoning as desired.

The seasoning may be varied according to the meat. For cured beef or cured pork a suitable seasoning for the above formula is:

Ounces
White pepper _____ 2
Garlic powder _____ 1

The compact frozen form and the uniform slicing make it possible to cut the dried slices into uniform area-sizes so that they all have the same weight. Merely counting such pieces for packaging yields uniform-weight packages.

An important feature of the invention is the inclusion of a major quantity of whole meat chunks in the mass to be frozen. Thus, in the slices whole meat pieces are present and visible. Another characteristic is the generally uniform color and appearance of the slices. There is no evidence of boundary lines between original chunks and the comminuted binder.

From the foregoing it is to be understood that the invention may be carried out in numerous ways without departing from the spirit and scope of the appended claims.

I claim:

1. The method comprising subjecting whole lean meat chunks to the preserving action of sodium chloride, separately subjecting comminuted lean meat to the preserving action of sodium chloride, thoroughly mixing a major quantity of the chunks with a minor and bonding quantity of the comminuted meat, packing the mixture into a solid mass in a confining form, freezing the mixture to a solid in said form, softening the frozen form by elevating the temperature to the vicinity of 28° F., cutting the softened form into uniformly thin slices, heating the slices to attain a temperature of at least 160° F., whereby to set the juices in the mass at the surfaces of the chunks to bond the chunks together, cooling the slices, and dehydrating the slices.

2. The method comprising subjecting whole lean meat chunks to the preserving and curing action of sodium chloride and curing salt of alkali-metal nitrite or nitrate, or both, separately subjecting comminuted lean meat to the same preserving and curing action, thoroughly mixing a major quantity of the chunks with a minor and bonding quantity of the comminuted meat, packing the mixture into a solid mass in a confining form, freezing the mixture to a solid in said form, softening the frozen form by elevating the temperature to the vicinity of 28° F., cutting the softened form into uniformly thin slices, heating the slices to attain a temperature of at least 160° F., whereby to fix the cured red color and to set the juices in the mass at the surfaces of the chunks to bond the chunks together, cooling the slices, and dehydrating the slices.

3. The method of claim 2 in which the meat is beef or pork or a mixture thereof.

4. The method of claim 2 in which the meat is beef or pork or a mixture thereof, in which the slices are heated to attain a temperature in the range from 160° F. to 200° F., and in which the slices are dehydrated at a temperature in the vicinity of 120° F.

5. A dried meat product consisting essentially of the dried product of a uniformly thin slice of a lean meat mass of which the meat consists of a major quantity of whole meat chunks and a minor bonding quantity of comminuted meat, the pieces of meat in said product being bonded by solids derived largely from the juices of the comminuted meat, and said pieces containing preservative sodium chloride.

6. A dried product according to claim 5 in which the meat is cured beef or pork or a mixture thereof, said meat having the thermally fixed red cured color.

7. Packaged meat comprising a sealed plastic envelope devoid of air within, and containing at least one substantially uniformly thin slice consisting essentially of salt-preserved meat, said meat in said slice consisting of sliced pieces of whole meat and mixed therewith the meat particles of comminuted meat, the meat components being integrated by dried binder derived largely from the solids content of the juices from the comminuted meat.

8. The packaged meat of claim 7 in which the meat is cured beef or cured pork or a mixture thereof, having the bright red color of cured meat.

References Cited

UNITED STATES PATENTS

| | | | |
|---|---|---|---|
| 2,461,291 | 2/1949 | McKee | 99—208 X |
| 3,100,152 | 8/1963 | Williams | 99—108 |
| 3,165,416 | 1/1965 | Sleeth et al. | 99—208 X |

OTHER REFERENCES

Rose et al., "The Condensed Chemical Dictionary," 1956, 5th edition, published by Reinhold Publishing Corporation, New York, p. 998, article entitled Sodium Chloride. Copy in group 172, U.S. Patent Office.

HYMAN LORD, *Primary Examiner.*

U.S. Cl. X.R.

99—174